(12) United States Patent
Matsuda et al.

(10) Patent No.: US 6,285,470 B1
(45) Date of Patent: Sep. 4, 2001

(54) IMAGE READING APPARATUS

(75) Inventors: Shinya Matsuda, Kyoto; Shinya Uchikawa, Toyokawa, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/120,694

(22) Filed: Jul. 22, 1998

(30) Foreign Application Priority Data

Jul. 22, 1997 (JP) .................................................... 9-195883

(51) Int. Cl.⁷ ........................................................ H04N 1/04
(52) U.S. Cl. ........................... 358/474; 358/474; 358/475
(58) Field of Search .................................. 358/474, 475, 358/488, 464, 462, 486, 408, 493

(56) References Cited

U.S. PATENT DOCUMENTS

| | | |
|---|---|---|
| 5,767,945 | * 9/1998 | Field ....................................... 355/39 |
| 5,808,756 | * 9/1998 | Matsuda ................................ 358/474 |

FOREIGN PATENT DOCUMENTS

| | | |
|---|---|---|
| 5-183749 | 7/1993 | (JP) . |
| 7-87295 | 3/1995 | (JP) . |
| 8-237485 | 9/1995 | (JP) . |

* cited by examiner

*Primary Examiner*—Jerome Grant, II
*Assistant Examiner*—Negussie Worku
(74) *Attorney, Agent, or Firm*—Sidley Austin Brown & Wood

(57) ABSTRACT

In an image reading apparatus for reading from above the image of a document, which has some thickness like a book or a file and is laid on a document table with its reading surface facing upward, a histogram regarding the brightness distribution of the reading surface is generated based on the image data of the reading surface, and the mode brightness and the maximum brightness of the reading surface are calculated, and it is determined whether show-through exists on the reading surface depending on the difference between the mode brightness and maximum brightness for preventing false detection of the base brightness caused by show-through effect.

17 Claims, 8 Drawing Sheets

IMAGE READING APPARATUS

BACKGROUND OF THE INVENTION

1. Field of the Invention

The present invention relates to an image reading apparatus, in particular, an image reading apparatus for reading from above a document laid facing upward.

2. Description of the Related Art

When an image exists on the back side of the reading surface, it occurs sometimes that the image on the back surface can be seen through the paper. Thus, it is difficult to determine the base brightness of the reading surface accurately and impossible to express the detected image in a proper density. This see-through phenomenon of the back surface image will be called hereinafter as "show-through". The show-through phenomenon is more conspicuous when the thickness of the paper is thin. When there is an error in detecting the base brightness, the density control becomes inaccurate and may cause whitening of characters thus making them illegible.

The common practice used in copying machines to avoid this show-through is to eliminate any images below a certain density level, thus making it possible to maintain the base brightness constant and to remove show-through images. However, if the density of the image on the reading surface is too low, the elimination of all images below a certain level uniformly can cause a problem of inadvertently eliminating a necessary portion of the images on the reading surface.

For example, Japanese Patent Unexamined Publication JP-A-07-87295 (1995) discloses a technique to solve such a problem. Particularly, it determines an accurate base density by multiplying the back surface image data with a certain ratio to obtain the back surface component, and subtracting the component from the reading surface image data to extract only the actual content of the reading surface.

Further, Japanese Patent Unexamined Publication JPA-05-183749 (1993) discloses another technique to solve such a problem based on the assumption that the density distribution of the background pixels would be a normal distribution. In detail, it determines the density range of the background using the mode "mm" of the density histogram as a reference, and separates the image part from the background using "2×m" as the threshold value or the upper limit of the density range.

In yet another technology disclosed by Japanese Patent Unexamined Publication JP-A-08-237485 (1996), a brightness histogram was prepared and the base area was defined as the vicinity of the mode of the histogram. In other words, a brightness slightly lower than the brightness that constitutes the mode is used as the boundary for separating the image part from the background.

However, the above-mentioned technologies have the following problems.

First, the technology disclosed by Japanese Patent Unexamined Publication JP-A-07-87295 (1995) requires an accurate alignment of the image positions on the reading surface and on its back surface before two images are compared. In case of automatically transferring a paper into a position on a platen glass, turning it over using an auto document feeder and reading the back surface of the paper, the positions of the front surface and the back surface are approximately equal. Because the paper consists of single sheet and is thin. Therefore, it is possible to align the image of the front surface with the image on the back surface and compare the two images accurately.

On the other hand, in case of reading spread pages of a document consisting of multiple pages, such as a book or a file with some thickness, from above, the reading surface is composed of the right and left pages, and the right page of the reading surface is the back surface of the left page of the next reading surface, and the left page of the reading surface is the back surface of the right page of the previous reading surface. If the number of pages on the right and left sides is different, the height of the surface is different between the right and left sides, and the image of the front surface and the image of the back surface have different positions. Consequently, it is difficult to accurately align the positional relation between the images of the reading surface and the back surface. In conclusion, this technology presents a problem for a document consisting of multiple pages, such as a book or a file with some thickness, that it cannot extract the image of the reading surface accurately.

The technologies disclosed by Japanese Patent Unexamined Publications JP-A-05-183749 (1993) and JP-A-08-237485 (1996) assume that the area of the image data where the mode of the density or the brightness exists is the base area. As a result, if there is a strong show-through, the mode can be constituted of the density or brightness of the show-through area. In other words, since the mode does not represent the density or brightness of the base, it can cause an error in detecting the density or brightness of the base.

SUMMARY OF THE INVENTION

The object of the present invention is to provide an image reading apparatus that is capable of setting up a proper base density even for an image affected by show-through.

Another object of the present invention is to obtain a clean image by eliminating the effect of show-through in an image reading apparatus wherein a document with some thickness, such as a book or a file, is read from above.

In one aspect of this invention, a brightness histogram is produced from the detected image data, the mode brightness and the maximum brightness are obtained from the brightness histogram, and it is determined whether any show-through exists.

In another aspect of this invention, if it is determined that there is no show-through, the base brightness is determined from the mode brightness; on the other hand, if it is determined that there is a show-through, the base brightness is determined from the maximum brightness.

In another aspect of this invention, if it is determined that show-through exists, the image without show-through is obtained by subtracting the back surface image data from the image data of the reading surface.

Another aspect of this invention is to allow the user to choose between an image with a good reproducibility and an image without show-through even on the sacrifice of some reproducibility.

One aspect of the invention is an image reading apparatus comprising: a document table on which a document is placed with a reading surface that contains an image to be read facing upward; an image reading unit that reads images on the reading surface from above to capture image data; and a processor that generates a histogram regarding brightness distribution of the reading surface from the image data, calculates a mode brightness and a maximum brightness of the reading surface from the histogram, and determines whether show-through exists on the reading surface depending on difference between the mode brightness and the maximum brightness.

Another aspect of this invention is an image reading apparatus comprising: an image reading unit that captures image data by reading an image on a reading surface of a document; and a processor that generates a histogram regarding brightness distribution of the reading surface from the image data, calculates a mode brightness and a maximum brightness of the reading surface from the histogram, and determines whether show-through exists on the reading surface depending on difference between the mode brightness and the maximum brightness.

Another aspect of this invention is an image reading method comprising the steps of: (a) capturing image data by reading an image on a reading surface of a document; (b) generating a histogram regarding brightness distribution of the reading surface based on the image data; (c) calculating a mode brightness and a maximum brightness of the reading surface based on the histogram; and (d) determining whether show-through exists on the reading surface depending on difference between the mode brightness and maximum brightness.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 3 is a brightness histogram produced by reading a document consisting of multiple pages, such as a book or a file, wherein FIG. 3A is a case with no show-through, FIG. 3B is a case with some show-through, and FIG. 3C is a case with intensive show-through;

DETAILED DESCRIPTION OF THE PREFERRED EMBODIMENT

The embodiments of this invention will be described below with reference to the accompanying drawings.

Figure 1:
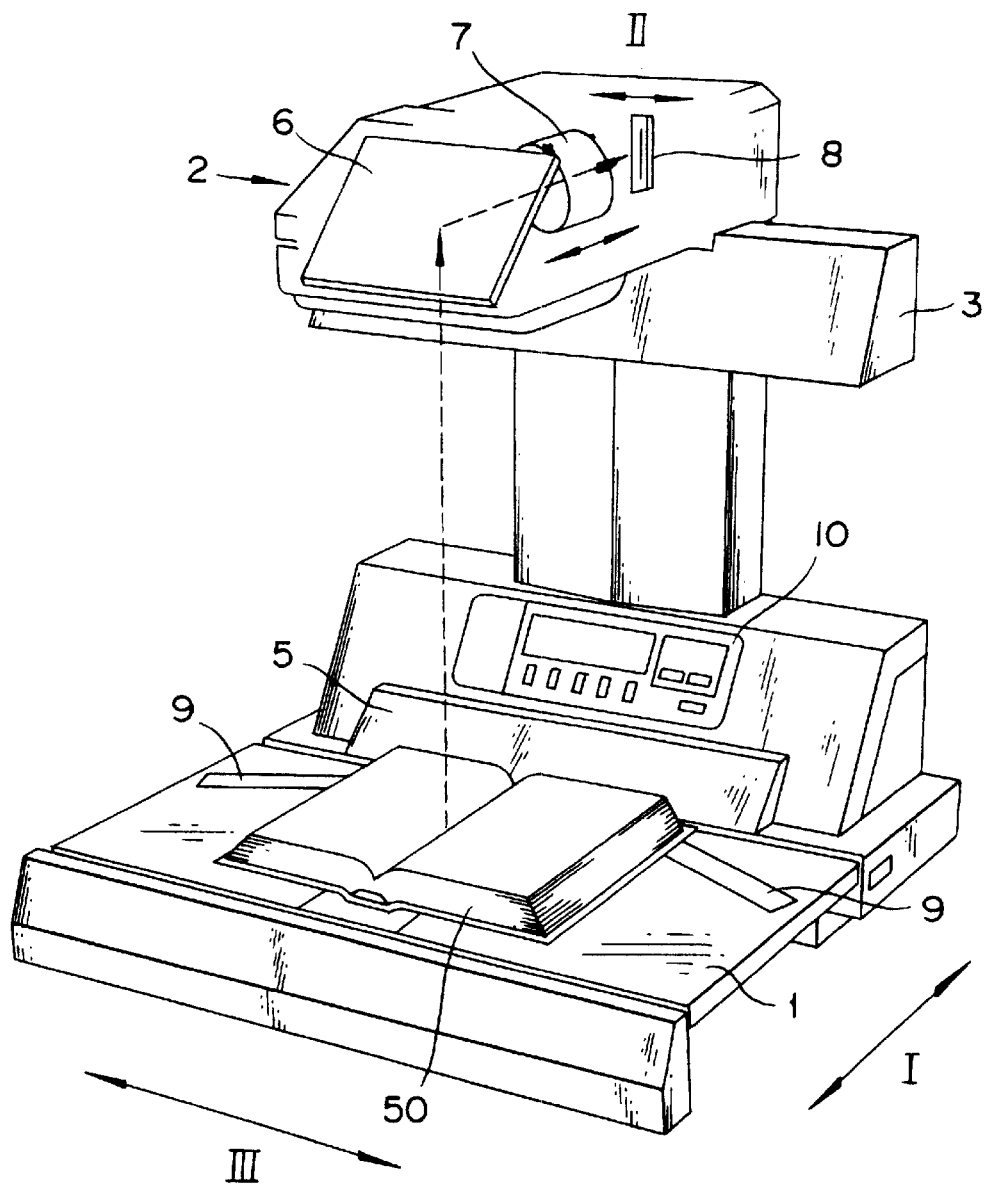
FIG. 1 is a perspective view illustrating the whole construction of the image reading apparatus according to an embodiment of the present invention.

FIG. 1 is a perspective drawing of the overall scheme of an image reading apparatus according to an embodiment of the present invention, which is designed to read documents with some thickness consisting of multiple pages, such as books and files.

The image reading apparatus is equipped with a document table 1, the left and right portions of which are adjustable up and down independently, and on which a document consisting of multiple pages and having some thickness (hereinafter called "book document") 50 is placed with the pages opened. The spread pages of the book document 50 are lighted with an illumination unit 3, and a page image is read by a CCD line sensor 8 via a reflection mirror 6 and a lens 7 in an image reading unit 2. Also, while the page image is being read, the side shape of the book document 50 projected on a range finding mirror 5 on the document table is read by a CCD line sensor 8 to detect the height of the reading surface. The height of the reading surface thus detected is used for focusing at the image reading unit 2 and the distortion compensation to capture images without distortions.

Start keys 9 are provided on the document table 1 at locations convenient for turning on while opening the book document 50 and holding both sides of it with both hands. Also an operating panel 10 is provided toward the back of the document table 1.

The CCD line sensor 8 provided inside the image reading unit 2 has photosensors arranged from the front of the apparatus toward the back of it, or in the direction of arrow mark I shown in FIG. 1 as main scanning direction. The CCD line sensor 8 travels driven by a motor in the direction of arrow mark II shown in FIG. 1 as secondary scanning direction, which is also shown as the arrow mark III in the drawing in relation to the document.

Figure 2:
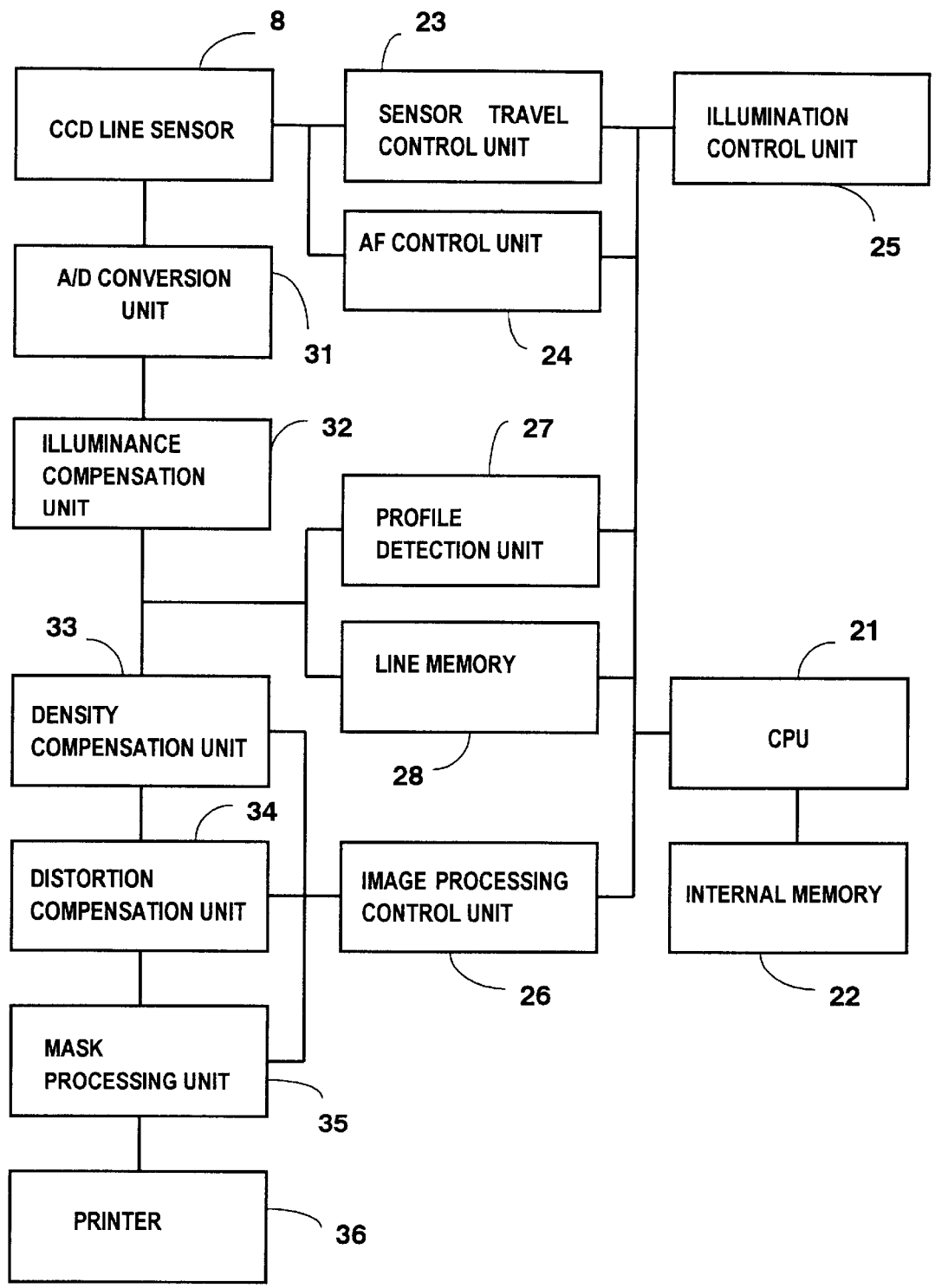
FIG. 2 is a block diagram of the control system of the image reading apparatus.

FIG. 2 is a block diagram for explaining the control system of the image reading apparatus according to the embodiment of the invention.

The control system is broadly divided into a control unit and an image reading unit to read the image. CPU 21 of the control unit is in charge of the travel control of the CCD line sensor 8 in the secondary scanning direction (sensor travel control unit 23), automatic focusing control (AF control unit 24), lighting control for the illumination unit 3 (illumination control unit 25), and control for various types of image processing (image processing control unit 26).

Concerning the image reading unit, the image data detected by the CCD line sensor 8 is first converted to digital data at an A/D conversion unit 31, and then outputted to a printer 36 via an illuminance compensation unit 32, a density compensation unit 33, a distortion compensation unit 34 and a mask processing unit 35.

The digital data after A/D conversion is inputted into a profile detection unit 27 and a line memory 28 during the preliminary scanning. At the profile detection unit 27, an external boundary line of the reading surface is detected and the image projected on the range finding mirror 3 is detected. Based on the thus detected results, the size and the height distribution of the reading surface are determined and stored in the internal memory 22 of the CPU 21 as the height measurement data and image region data. The line memory 28 is used for preparing a histogram of the data for each line from the CCD line sensor 8 as described later.

The CPU 21 prepares the data for image distortion compensation, mask processing and focusing based on the size and the height distribution of the reading surface, as well as the data for determining the existence of show-through and density compensation data based on the histogram. The reading surface size data thus prepared will be sent to the mask processing unit 35 via the image processing control unit 26 during the main scanning time, and unnecessary parts are discarded, so that only the necessary parts will be outputted as the image on the reading surface. The distortion compensation data obtained from the height distribution data is sent to a distortion compensation unit 34 via the image processing control unit 26 to be used for compensating image distortions. The data for focusing is sent to the AF control unit 24 and used for focusing of the lens 7. The density compensation data is sent to the density compensation unit 33 via the image processing control unit 26 to be used for compensation of the image density.

Before explaining the operation of the image reading apparatus according to the embodiment of the present invention, let us explain about the relation between the base density of the reading surface and the show-through.

FIG. 3 is an example of the brightness histogram when the book document is read.

Figure 3A:
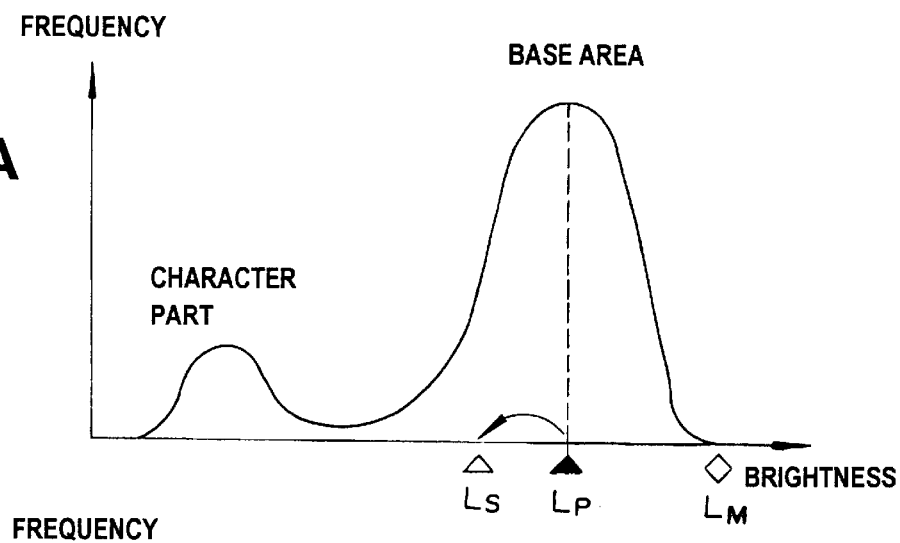

When no show-through exists, the brightness histogram normally has two peaks as shown in FIG. 3A, a large group in the high brightness region and a small group in the low brightness region. The large group corresponds to the base area of the reading surface and the small group corresponds to various images such as characters on the reading surface. In such a case, using the mode brightness (to be called the peak brightness $L_P$) as a reference, the base brightness $L_S$ is determined while the boundary is a brightness slightly lower than the peak brightness. This is the method used in the prior art and is similar to the technology disclosed by Japanese Patent Unexamined Publication JP-A-08-237485 (1996).

Figure 3B:
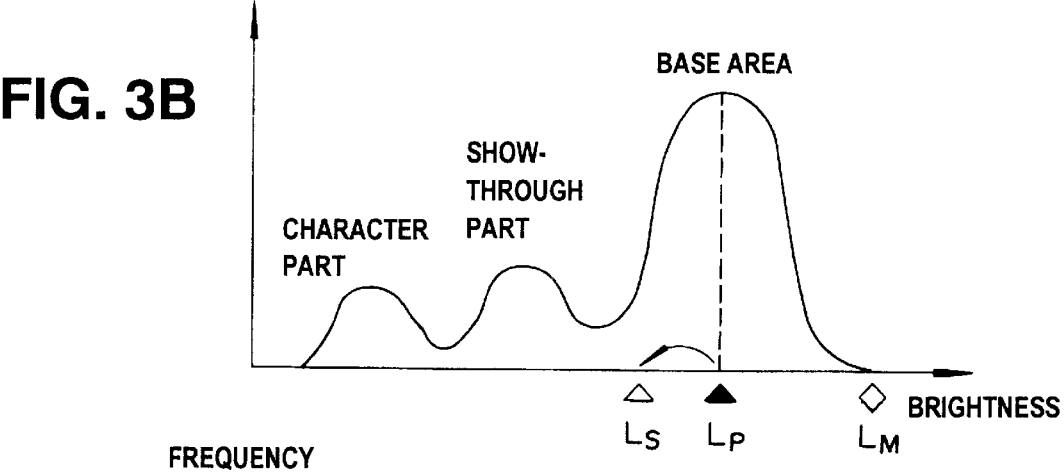
Figure 3C:
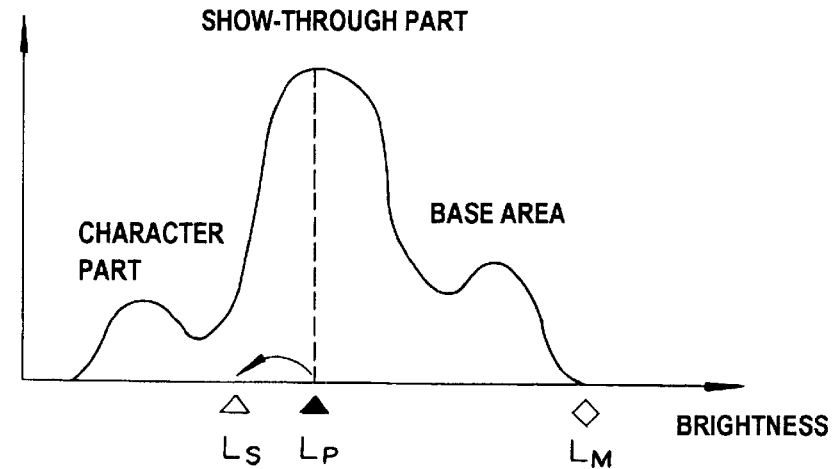

However, if the paper is thin and also the density of characters is high such as in the case of dictionaries and telephone directories, the image on the back surface can be seen through the paper (show-through). FIG. 3B and FIG. 3C show the histograms of such a case. FIG. 3B shows a case where the degree of the show-through is relatively low, and the brightness of the show-through part appears between the brightness of the character part and the brightness of the base area. In this case, the brightness of the base area is also the peak brightness $L_P$, so that it causes no problem if the base brightness $L_S$ is determined as a value obtained by subtracting a predetermined value from the peak brightness $L_P$.

However, if severe show-through exists, the brightness frequency of the show-through part becomes larger than the brightness frequency of the base area as shown in FIG. 3C. The peak brightness $L_P$, in this case is not the brightness of the base area but rather the brightness of the show-through part. Therefore, if a brightness obtained by subtracting a predetermined value from the peak value $L_P$ is used as the base brightness $L_S$ as in the prior art, a substantially low brightness ends up being specified as the base brightness $L_S$. In other words, it fails to set up a preferable base brightness.

In the present embodiment, such erroneous detection caused by show-through is prevented by judging the presence of show-through from the histogram as shown in FIG. 3C and making a proper determination of the base brightness (density) based on the judgment.

The presence of show-through is determined based on whether the peak brightness $L_P$, which is the mode brightness, exists within the specified region from the maximum brightness $L_M$. This is because there is a certain proportional relation as indicated in the following formula (1) between the peak brightness $L_P$ and the maximum brightness $L_M$, if the number of pixels that belong to the base area is constant. It shows that the fluctuation of the brightness of the reading surface is contained within the desired range, which is proportional to the brightness.

$$L_M = a \times L_P + b \quad (1)$$

where constant "a" is a value according to the base density fluctuation, and constant "b" is a value according to the fluctuation of the sensitivity and the characteristic value of the apparatus. The constant "b" takes an approximately constant value in terms of the brightness scale, which depends on the type of image sensor and the structure of the signal processing circuit, but is generally around 5 for 255 graduations. Also, the reason why there is a difference between the peak brightness $L_P$ and the maximum brightness $L_M$ is mainly the fluctuation of the base brightness and the fluctuation of the sensitivity (noise) of the image sensor (CCD line sensor in case of the present invention).

As described later, the brightness is converted to the density by logarithmic conversion. Therefore, the fluctuation of the base brightness takes a constant value regardless of the base density in terms of the density scale. Let the peak density value of the base area be $D_P$, and the base density fluctuation be $\alpha$, the relation between the peak brightness $L_P$ and the maximum brightness $L_M$ can be expressed as follows:

$$D_P = -\log_{10} L_P \quad (1a)$$

$$D_P - \alpha = -\log_{10} L_M \quad (1b)$$

Modifying the formula (1a) and (1b), we get:

$$-\log_{10} L_P - \alpha = -\log_{10} L_M \quad (1c)$$

and we get the following from this formula (1c):

$$\alpha = \log_{10} L_P - \log_{10} L_P = \log_{10} (L_M / L_P) \quad (1d)$$

In case of a normal reading surface, the base density fluctuation $\alpha$, is approximately 0.1. Therefore, $10^{60}$ (=$L_M/L_P$) = $10^{0.1}$ ≈ 1.26. As a result, the constant "a" in the formula (1) (=$L_M/L_P - b/L_P \approx L_M/L_P$) is approximately 1.26.

The formula (1) can now be expressed as:

$$L_M = 10^\alpha \times L_P + b = 1.26 + L_P + b \quad (1e)$$

Consequently, the existence of show-through can be determined by the fact that the value obtained by subtracting the peak brightness $L_P$ from the maximum brightness $L_M$ exceeds a certain limit.

Figure 4:
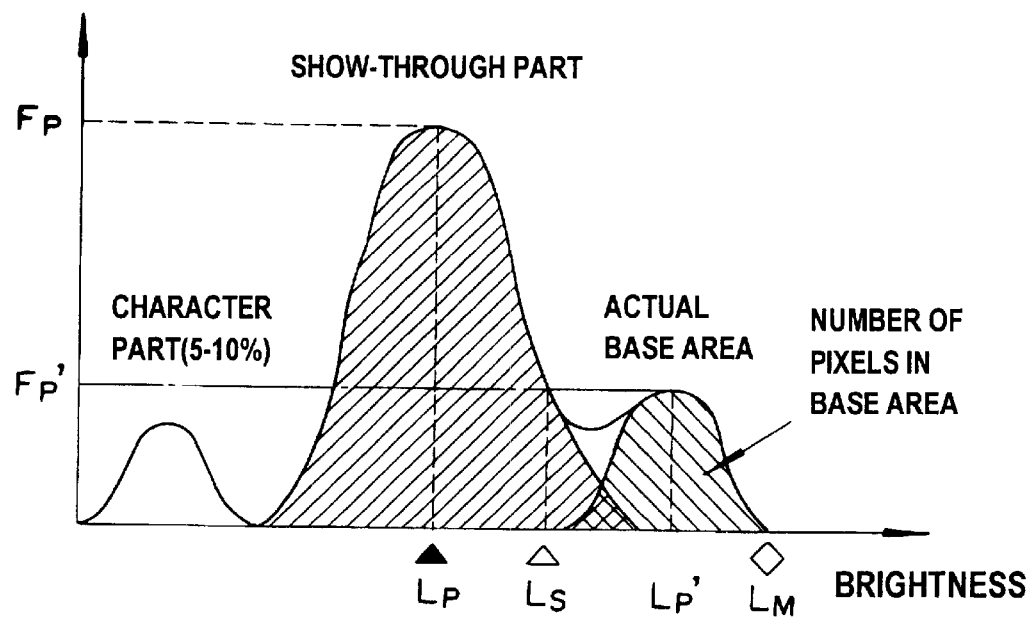
FIG. 4 is a drawing for explaining the method of judging the base brightness.

Next, let us explain how we can determine the base brightness referring to FIG. 4.

When the existence of show-through is confirmed, the base brightness $L_S$ can be detected using the maximum brightness $L_M$. First of all, the number of pixels in the base area is calculated from the peak frequency $F_P$ (frequency of the peak brightness $L_P$) detected in the show-through part.

The following formula (2) is obtained by modifying the formula (1) considering the number of pixels corresponding to the frequency of brightness:

$$L_M / F_P = a \times L_P + b \quad (2)$$

This indicates that the shape of the histogram changes analogously when the number of pixels changes. The total frequency of the histogram with a single peak produced from the base area or the show-through part having substantially the same density is proportional to the height (peak frequency $F_P$) and the width of the skirt ($L_M - L_P$). Approximating the shape of the histogram with an isosceles triangle, the total frequency $F_T$ can be shown with the following formula (3):

$$F_T = (L_M - L_P) \times F_P \quad (3)$$

Moreover, the following formula (4) and (5) can be deduced from the formula (2) and (3):

$$L_P = (L_M^2 - b \times F_T)/(a \times F_T + L_M) \quad (4)$$

$$F_T = ((a \times F_P - 1) \times L_P + b) \times F_P \quad (5)$$

Namely, based on the formula (5), the number of pixels (total frequency $F_T$) existing in the show-through part can be obtained from the detected peak frequency $F_P$ and the peak brightness $L_P$.

Incidentally, the number of pixels in the character part is 5–10% of the total pixels in case of a typical reading surface of a book document. Therefore, the number of pixels $F_T'$ in the actual base area can be calculated by subtracting the number of pixels $F_T$ in the show-through part obtained from the formula (5) and the number of pixels in the character part (5–10% of the total pixels) from the total number of pixels sampled.

By substituting the maximum brightness $L_M$ and the number of pixels $F_T'$ in the base area into the following formula (4a), we get a corrected value of the peak brightness $L_P$, or the true peak brightness $L_P'$ in the base area:

$$L_P'=(L_M^2-b \times F_T')/(a \times F_T'+L_M) \quad (4a)$$

Next, the base brightness $L_S$ is calculated based on the linear relationship between the corrected peak brightness $L_P'$ and the base brightness $L_S$ as shown in the following formula (6):

$$L_S=c \times L_P'-d \quad (6)$$

where "c" and "d" in the formula are constants.

On the other hand, if no show-through exists or only minor show-through exits, as shown in FIG. 3A or 3B, or the value, which is obtained by subtracting the peak brightness $L_P$ from the maximum brightness $L_M$, does not exceed the desired range, the base brightness $L_S$ can be calculated as in the prior art based on the linear relationship between the detected peak brightness $L_P$ and the base brightness $L_S$ as shown in the formula (7) shown below:

$$L_S=c \times L_P-d \quad (7)$$

where "c" and "d" in the formula are constants.

Figure 5:
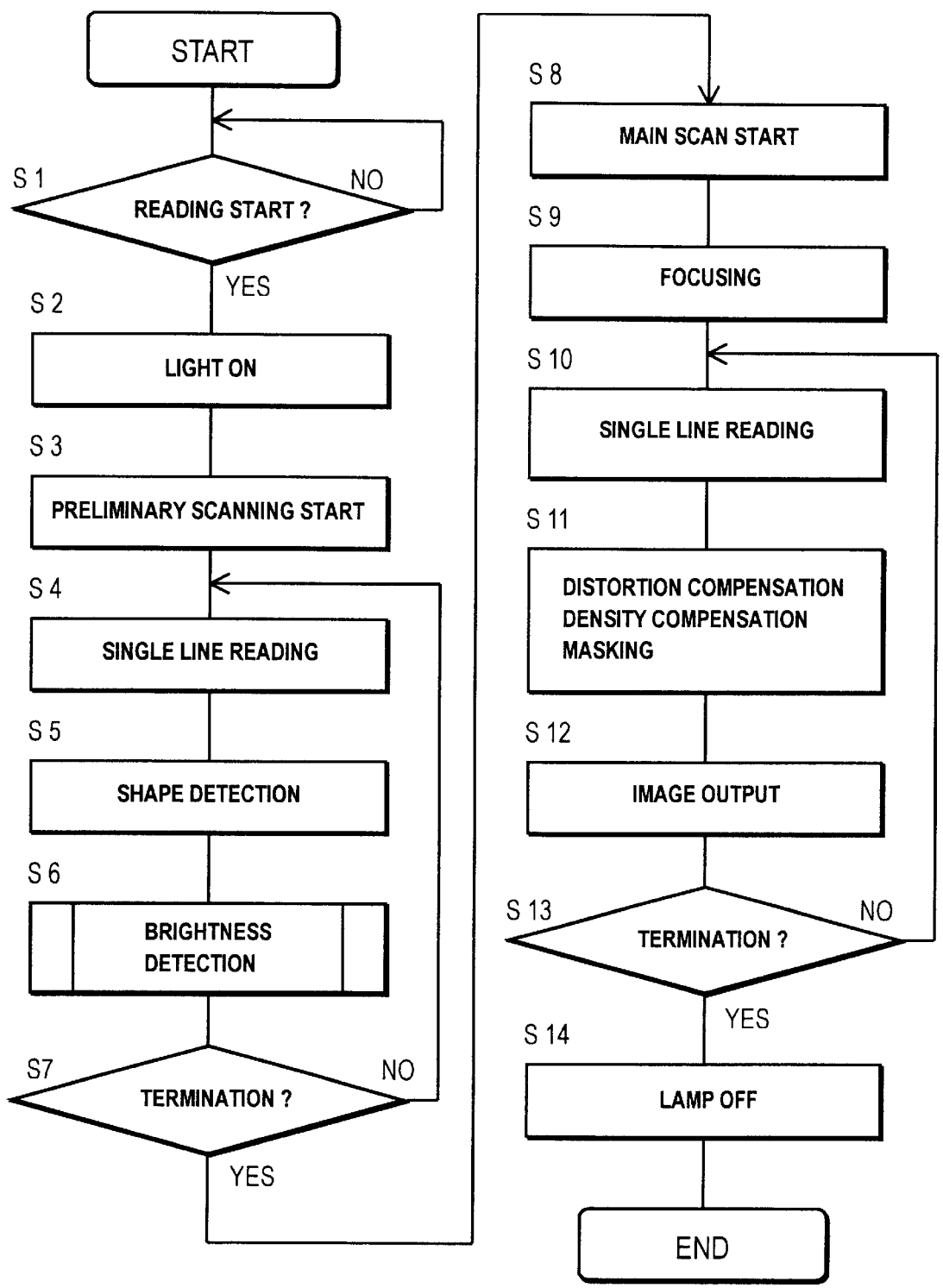
FIG. 5 is a flow chart for explaining the image reading procedure.

Next, let us describe the operation of the entire apparatus referring to the flow chart shown in FIG. 5.

As shown in the figure, the image reading starts when the start key 9 is pushed (S1), the illumination unit 3 is turned on (S2), and the preliminary scan starts (S3). In the preliminary scan (S4), the image is read (S4), the height of the reading surface of the book document 50 is determined based on the image of the range finding mirror 5(S5), the brightness is detected (S6), and the preliminary scan cycle is terminated when the desired condition is met (S7).

Next, the main scanning starts (S8). Automatic focusing is executed based on the height distribution data of the reading surface (S9), the image is read (S10), compensation of the distortion and the density and masking of the image are executed (S11), and image data is outputted (S12). The main scanning is terminated when the desired condition is met (S13) and the illumination unit 3 is automatically turned off (S14).

Figure 6A:
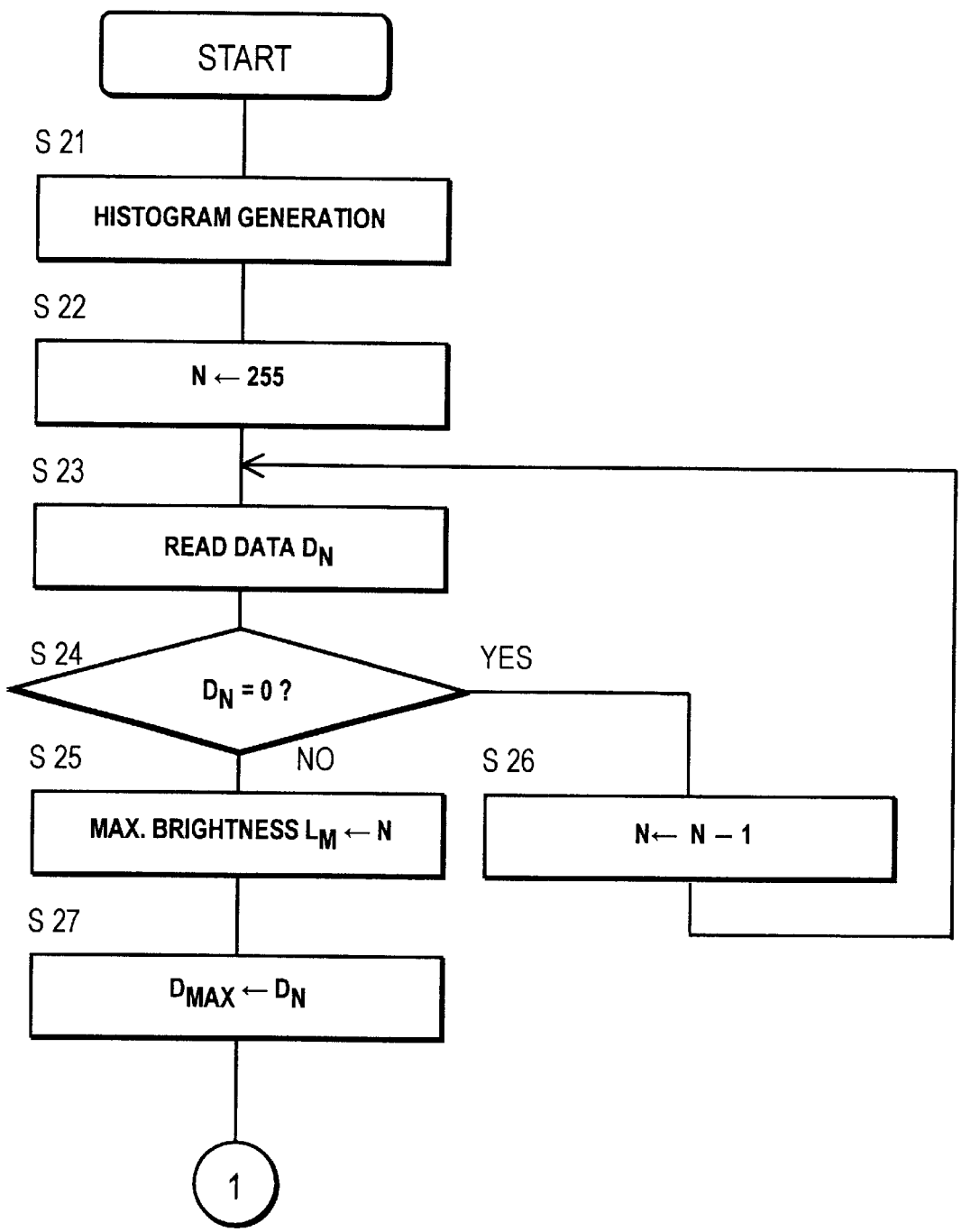
FIGS. 6A and 6B constitute a flow chart for explaining the base brightness detection procedure.
Figure 6B:
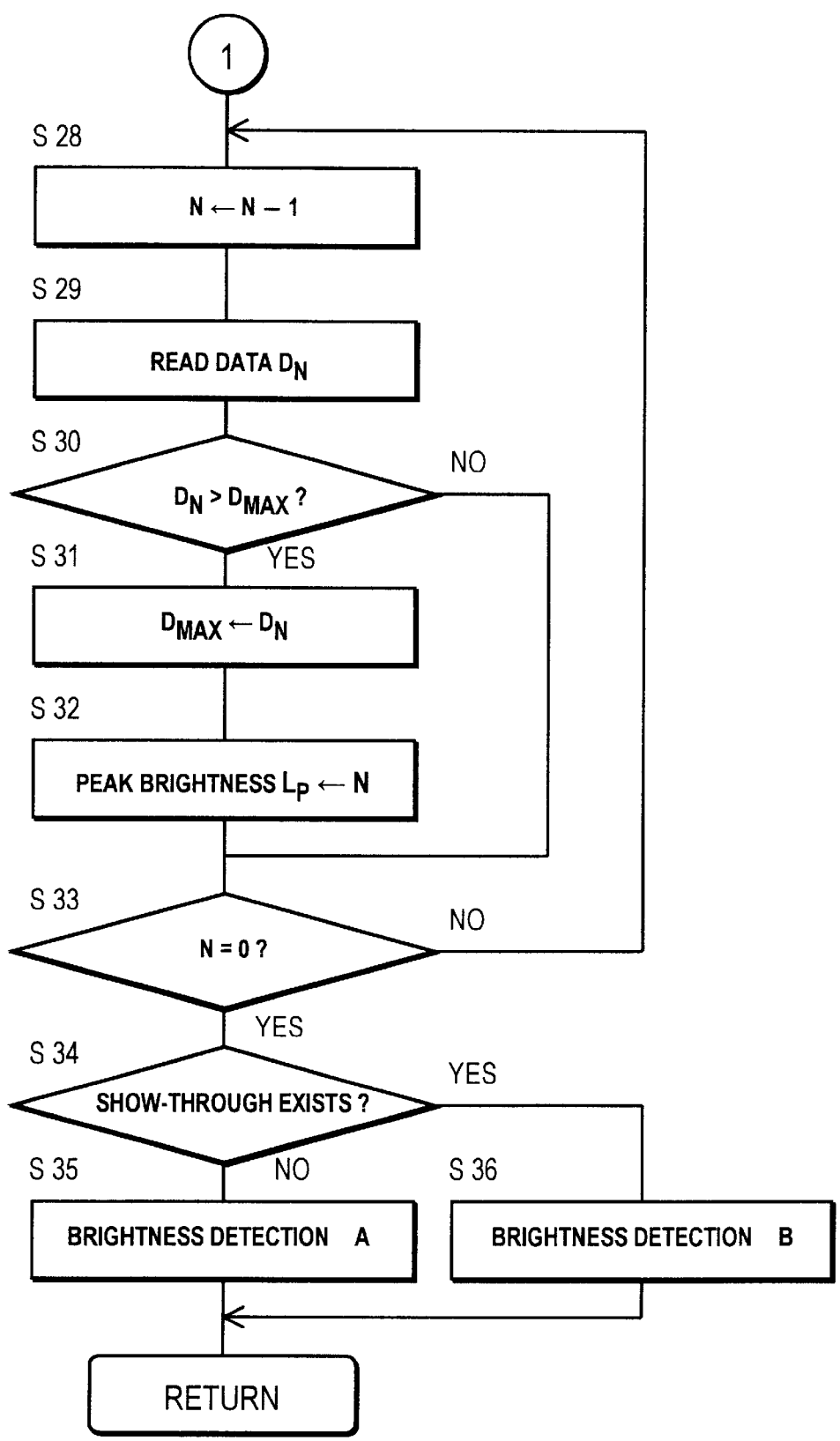

Let us now describe the procedure of detecting the base brightness referring to the flow chart shown in FIG. 6A and 6B.

First, a single line portion of histogram is generated from the single line portion of the image data in the main scanning direction, which is read by the CCD line sensor 8 as it moves during the preliminary scanning (refer to steps S3 and S4), using the line memory 28 and the CPU 21 (S21). More specifically, the density gradation of the pixel is expressed in an 8 bit data (0–255), while the address of the line memory 28 is constituted as an 8-bit structure (0–255 address values). By conducting an action of adding the value "1" to the address data that corresponds to the pixel brightness for each pixel contained in a single line in the main scanning direction, a single line portion of histogram is generated in the line memory 28.

Next, the steps of reading the data $D_N$ at the address N of the line memory 28 in a descending order, or sequentially from the higher brightness side (255 side) of the address and storing the first address N where the data $D_N$ changes from 0 as the maximum brightness $L_M$ are executed (S22–26). Then, the steps of comparing the data $D_N$ of the address N with the previously stored data $D_{MAX}$ and storing the larger one as the data $D_{MAX}$ and the address N of the larger one as the peak brightness $L_P$ are repeated until the address N becomes "0"(S27–S33). Incidentally, the data $D_{MAX}$ is a variable where the data of the address N for the maximum brightness $L_M$ is stored temporarily.

Next, the remainder between the maximum brightness $L_M$ and the peak brightness $L_P$ is found and it is judged whether there is any influence of show-through on the base brightness depending on whether the difference is within the predetermined value (S34).

If it is determined that there is no influence of show-through, the base brightness is computed by the brightness detection procedure A as the conventional procedure using the formula (7) (S35). If it is determined that there is an evidence of show-through, the base brightness is computed by the brightness detection procedure B as the show-through procedure using the formula (2)–(6) (S34).

Thus, an accurate base brightness detection and determination can be accomplished without being affected by show-through.

Next, let us describe the density compensation of the image.

Figure 7:
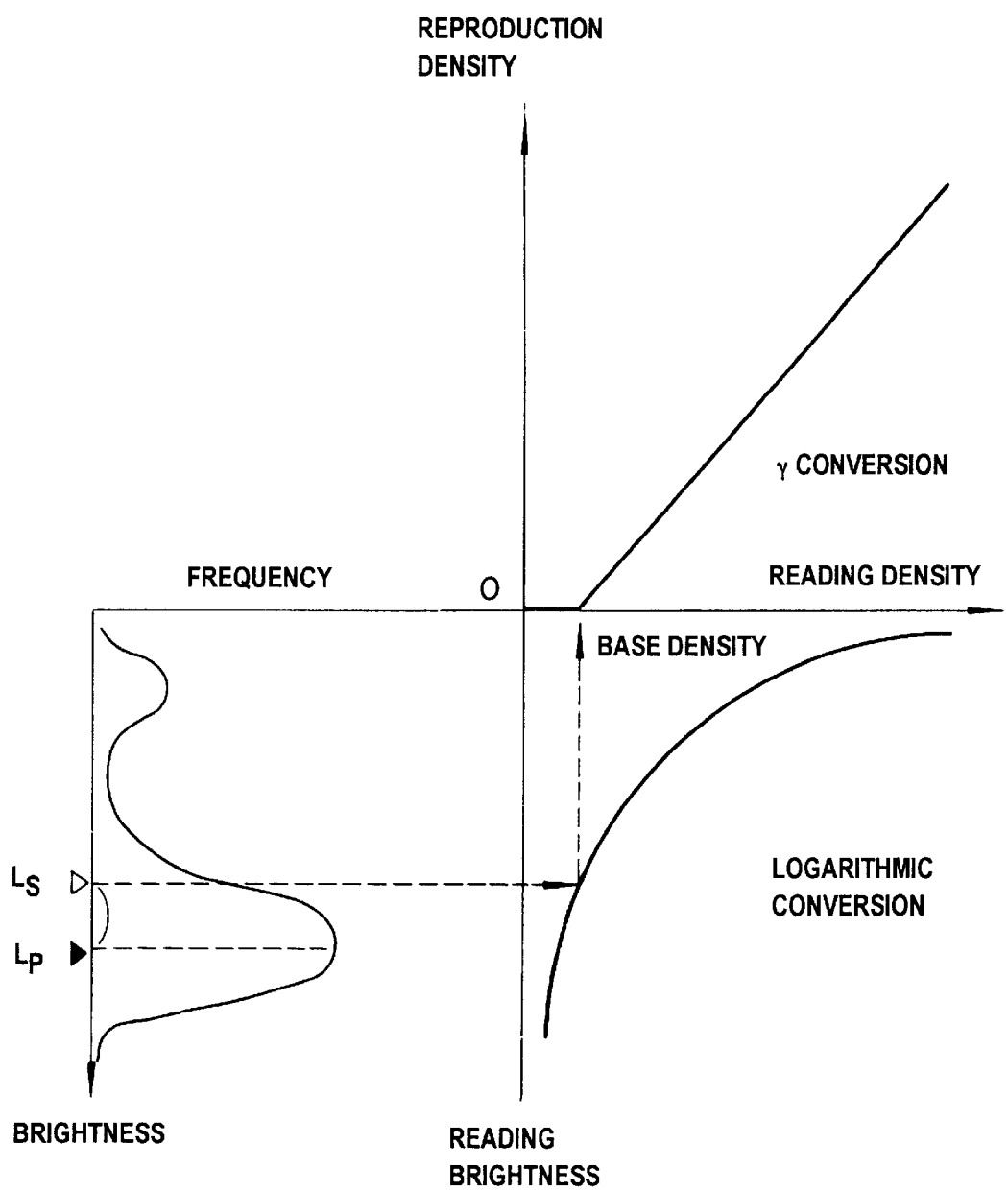
FIG. 7 is an explanatory drawing showing the relation between brightness and density of an image.

FIG. 7 is a diagram illustrating the relation between the brightness histogram of a specific line of the reading surface and the base density.

First of all, the detected base brightness is converted into the base density. This is because the strength of light reflected on a medium such as paper is proportional to not base brightness but base density of the medium as to human vision.

This conversion is done using the following formula (8) by logarithmic conversion:

$$D=-\log_{10} R \quad (8)$$

wherein D is density and R is brightness.

Next, the data of a density lower than the detected base density is set to white (or "0" as a density data), and a conversion curve (γcurve) is prepared to hold a certain relation between the base density and the maximum density. Then, all the image data on the reading line is converted based on the γcurve. By doing so, all the data that are brighter than the base are treated as white, and a relationship, which can linearly reproduce image data darker than the base density, is acquired.

By repeating the same procedure for all lines which have been read, the brightness of the base area can be removed and the image can be reproduced sharply. At the same time, proper density control can be accomplished based on the base brightness detection procedure.

If a light emitting display medium such as CRT is used as the output medium, the strength of light is proportional to its brightness. Therefore, this conversion is unnecessary.

As described above, the present embodiment can detect the base brightness of a document accurately regardless of whether or not show-through occurs. Therefore, it produces a good reproduction of pictures and characters in the document creating high picture quality.

However, if the show-through image density is high, accurate detection of the base brightness also results in reproducing the show-through image accurately. Therefore, considering the case where the user is more concerned about elimination of the show-through than reproducibility, or if the user wants to remove show-through images completely on the sacrifice of weak part of the image being read, the user is allowed to freely select the base brightness detection procedure using the formula (7). Namely, the user has the alternative of acquiring the best image reproducibility and the complete elimination of show-through on the sacrifice of a certain degree of reproducibility.

Also, it is possible to allow the selection prior to the start of reading. Also, if it is determined that the influence of show-through exists as a result of the preliminary scanning, it can be arranged to ask the user to decide the type of control. In other words, the user's selection is requested only when show-through exists. If so arranged, the number of user's setup items is that much less compared to the method where it is set up prior to the start of reading.

The present invention can also utilize the technology disclosed by Japanese Patent Unexamined Publication JPA-07-87295 (1995). Particularly, the back surface image may be reduced by subtracting the show-through image from the front surface image. Since the base brightness is accurately detected in this case, it provides a good reproducibility and produces images free from the show-through effect.

As explained in the above, in the present invention the presence of show-through is judged based on the difference between the peak brightness (mode brightness) and the maximum brightness of the histogram of the captured image. Therefore, it is possible to determine the presence of show-through accurately from the image data of the reading surface. In particular, even when there is a difference in height between the reading surface and the back surface as in the case of reading the opened pages of the book document from above, it can still determine accurately whether show-through exists or not.

It is also possible to determine the base brightness using the peak brightness or the maximum brightness based on the judgement result on the presence of show-through. In this case, accurate base brightness is acquired regardless of whether or not show-through occurs; good image reproducibility and a high image quality are provided.

Moreover, it is possible to make it selectable either to use the peak brightness or the maximum brightness in determining the base brightness. In other words, the user has the alternative of acquiring the best image reproducibility including the show-through image and the complete elimination of show-through on the sacrifice of a certain degree of reproducibility.

Also, if show-through exists, the present invention makes it possible to eliminate the show-through image by subtracting the back surface image from the front surface image.

It is obvious that this invention is not limited to the particular embodiments shown and described above but may be variously changed and modified without departing from the technical concept of this invention.

Further, the entire disclosure of Japanese Patent Application No. 09-195883 filed on Jul. 22, 1997, including the specification, claims, drawings and summary are incorporated herein by reference in its entirety.

What is claimed is:

1. An image reading apparatus comprising:
   a document table on which a document can be placed with a reading surface that contains an image to be read facing upwardly;
   an image reading unit that reads images on the reading surface from above to capture image data; and
   a processor that generates a histogram regarding brightness distribution of the reading surface from the image data, calculates a mode brightness and a maximum brightness of the reading surface from the histogram, and determines whether show-through exists on the reading surface depending on difference between the mode brightness and the maximum brightness.

2. An image reading apparatus according to claim 1, in which said processor determines that show-through exists when the difference is larger than a predetermined value and show-through does not exist when the difference is smaller than the predetermined value.

3. An image reading apparatus according to claim 1, in which said processor finds a base brightness that corresponds to a base area of the reading surface based on the maximum brightness if it determines that show-through exists, and finds the base brightness based on the mode brightness if it determines that show-through does not exist.

4. An image reading apparatus according to claim 3, in which said processor, if it determines that show-through exists, calculates a number of pixels in an area, which corresponds to the base area, from the maximum brightness, calculates a corrected mode brightness based on the number of pixels and the maximum brightness, and assumes a value, which is obtained by subtracting a predetermined value from the corrected mode brightness, as the base brightness.

5. An image reading apparatus according to claim 3, in which said processor, if it determines that show-through does not exist, assumes a value, which is obtained by subtracting a predetermined value from the mode brightness, as the base brightness.

6. An image reading apparatus according to claim 3, in which said process or, if it determines that show-through exists, selects either to calculate the base brightness by applying the maximum brightness, or to calculate the base brightness by applying the mode brightness, depending on a user's instruction.

7. An image reading apparatus according to claim 1, in which said processor, if it determines that show-through exists, captures necessary component of the image data of the reading surface by subtracting an image data of a surface opposite to the reading surface from the image data of the reading surface.

8. An image reading apparatus comprising:
   an image reading unit that captures image data by reading an image on a reading surface of a document; and
   a processor that generates a histogram regarding brightness distribution of the reading surface from the image data, calculates a mode brightness and a maximum brightness of the reading surface from the histogram, and determines whether show-through exists on the reading surface depending on difference between the mode brightness and the maximum brightness.

9. An image reading apparatus according to claim 8, in which said processor determines that show-through exists when the difference is larger than a predetermined value and show-through does not exist when the difference is smaller than the predetermined value.

10. An image reading apparatus according to claim 8, in which said processor finds a base brightness that corresponds to a base area of the reading surface based on the maximum brightness if it determines that show-through exists, and finds the base brightness based on the mode brightness if it determines that show-through does not exist.

11. An image reading apparatus according to claim 10, in which said processor, if it determines that show-through exists, calculates a number of pixels in an area, which corresponds to the base area, from the maximum brightness, calculates a corrected mode brightness based on the number of pixels and the maximum brightness, and assumes a value, which is obtained by subtracting a predetermined value from the corrected mode brightness, as the base brightness.

12. An image reading apparatus according to claim 10, in which said processor, if it determines that show-through does not exist, assumes a value, which is obtained by subtracting a predetermined value from the mode brightness, as the base brightness.

13. An image reading method comprising the steps of:
   (a) capturing image data by reading an image on a reading surface of a document;
   (b) generating a histogram regarding brightness distribution of the reading surface based on the image data;
   (c) calculating a mode brightness and a maximum brightness of the reading surface based on the histogram; and
   (d) determining whether show-through exists on the reading surface depending on difference between the mode brightness and maximum brightness.

14. An image reading method according to claim 13, in which said step (d) determines that show-through exists when the difference is larger than a predetermined value and that show-through does not exist when the difference is smaller than the predetermined value.

15. An image reading method according to claim 13, in which said step (d) finds a base brightness that corresponds to a base area of the reading surface based on the maximum brightness if said step (d) determines that show-through exists, and finds the base brightness based on the mode brightness if said step (d) determines that show-through does not exist.

16. An image reading method according to claim 15, wherein, if it is determined that show-through exists in step (d), the method further includes calculating a number of pixels in the base area from the maximum brightness, calculating a corrected mode brightness based on the number of pixels and the maximum brightness, and assuming a base brightness value, which is obtained by subtracting a predetermined value from the corrected mode brightness.

17. An image reading method according to claim 15, wherein, if it is determined that show through does not exist in step (d), the method further includes the step of assuming a base brightness value, which is obtained by subtracting a predetermined value from the mode brightness.

* * * * *

UNITED STATES PATENT AND TRADEMARK OFFICE
CERTIFICATE OF CORRECTION

PATENT NO. : 6,285,470 B1
DATED : September 4, 2001
INVENTOR(S) : Shinya Matsuda et al.

It is certified that error appears in the above-identified patent and that said Letters Patent is hereby corrected as shown below:

Column 6,
Line 15, delete "formula", and insert -- formulae --.
Line 20, delete "$\alpha=\log_{10}L_M=\log_{10}(L_M/L_P)$", and insert -- $\alpha=\log_{10}L_M-\log_{10}L_P=\log_{10}(L_M/L_P)$ --.
Line 58, delete "formula", and insert -- formulae --.
Line 59, delete "formula", and insert -- formulae --.
Line 61, delete "$L_P=(L_M^2-bxF_T)/(axF_T+L_M)(4)$", and insert
-- $L_P=(L_M^2-bxF_T)/(axF_T+L_M)$         (4) --.

Column 8,
Line 24, delete "formula", and insert -- formulae --.

Column 10,
Line 31, delete "process or,", and insert -- processor --.

Signed and Sealed this

Twenty-third Day of April, 2002

Attest:

*Attesting Officer*

JAMES E. ROGAN
*Director of the United States Patent and Trademark Office*